United States Patent
Zusman

(10) Patent No.: US 10,996,120 B1
(45) Date of Patent: May 4, 2021

(54) PRESSURE SENSOR

(71) Applicant: Vibration Measurement Solutions, Inc., Houston, TX (US)

(72) Inventor: George V. Zusman, Orchard Park, NY (US)

(73) Assignee: Vibration Measurement Solutions, Inc., Houston, TX (US)

( * ) Notice: Subject to any disclaimer, the term of this patent is extended or adjusted under 35 U.S.C. 154(b) by 0 days.

(21) Appl. No.: 16/675,687

(22) Filed: Nov. 6, 2019

(51) Int. Cl.
*G01L 1/16* (2006.01)
*G01L 23/22* (2006.01)
*F02D 35/02* (2006.01)

(52) U.S. Cl.
CPC .............. *G01L 1/16* (2013.01); *G01L 23/222* (2013.01); *F02D 35/023* (2013.01)

(58) Field of Classification Search
CPC ....... G01L 1/16; G01L 9/0022; G01L 9/0008; G01L 9/0025; G01L 23/222; G01L 23/10
See application file for complete search history.

(56) References Cited

U.S. PATENT DOCUMENTS

| | | | | |
|---|---|---|---|---|
| 5,201,228 A * | 4/1993 | Kojima | ................. | G01L 9/0075 73/724 |
| 5,353,643 A * | 10/1994 | Glaser | .................. | G01L 9/0001 73/708 |
| 6,539,819 B1 * | 4/2003 | Dreyer | ................... | G01D 11/24 73/431 |
| 2004/0206186 A1 * | 10/2004 | Clark | ....................... | G01L 23/10 73/753 |
| 2008/0011089 A1 * | 1/2008 | Friedl | ..................... | G01L 9/008 73/753 |
| 2014/0216175 A1 * | 8/2014 | Schricker | ................ | G01L 1/162 73/862.629 |
| 2016/0108720 A1 * | 4/2016 | Teowee | ................... | G01L 25/00 73/1.15 |
| 2018/0364113 A1 * | 12/2018 | Suzuki | ...................... | G01L 1/16 |

FOREIGN PATENT DOCUMENTS

EP    3399294 A1    11/2018

OTHER PUBLICATIONS

EPC, "Search Opinion", European Patent Application No. 17169078.7 (EP3399294), dated Oct. 30, 2017, 4 pages.

* cited by examiner

*Primary Examiner* — Helen C Kwok
(74) *Attorney, Agent, or Firm* — Walter W. Duft

(57) ABSTRACT

A piezoelectric pressure sensor is characterized by a piezoelectric transducer having substantially parallel piezoelectric plate faces oriented in planes that extend substantially parallel a principal longitudinal axis of the sensor, a pair of clamping members engaging the piezoelectric plate faces, a membrane cap covering the clamping members and mounted on a stem to define an enclosed protective chamber that isolates the piezoelectric transducer and the clamping members from an environment outside the membrane cap. The membrane cap has a membrane wall engaging outside faces of the clamping members. The membrane wall undergoes inward deflections in response to pressure increases in the environment outside the membrane cap. The clamping members undergo corresponding inward deflections in response to the inward deflections of the membrane wall. The inward deflections of the clamping members act on the piezoelectric plate faces, resulting in deformations of the piezoelectric transducer that produce corresponding electrical signals.

17 Claims, 3 Drawing Sheets

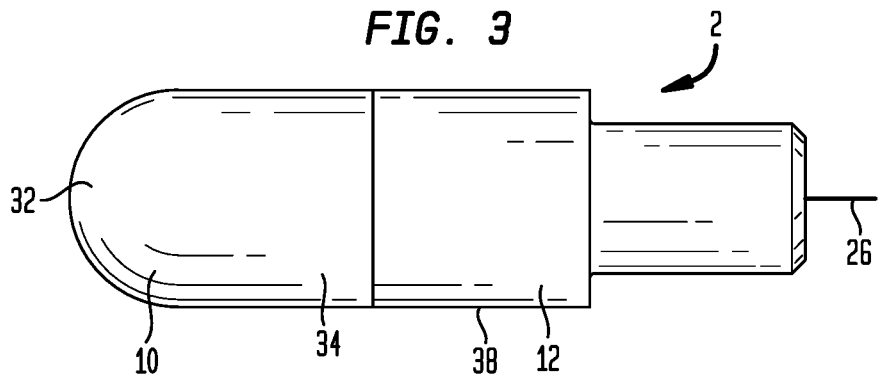
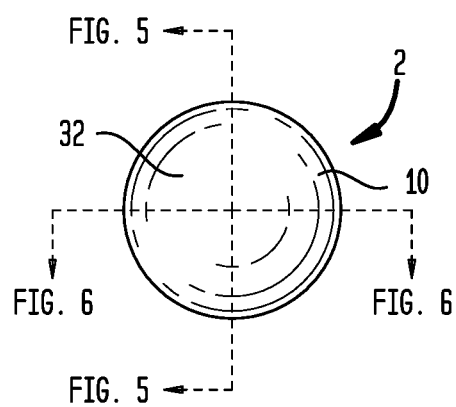
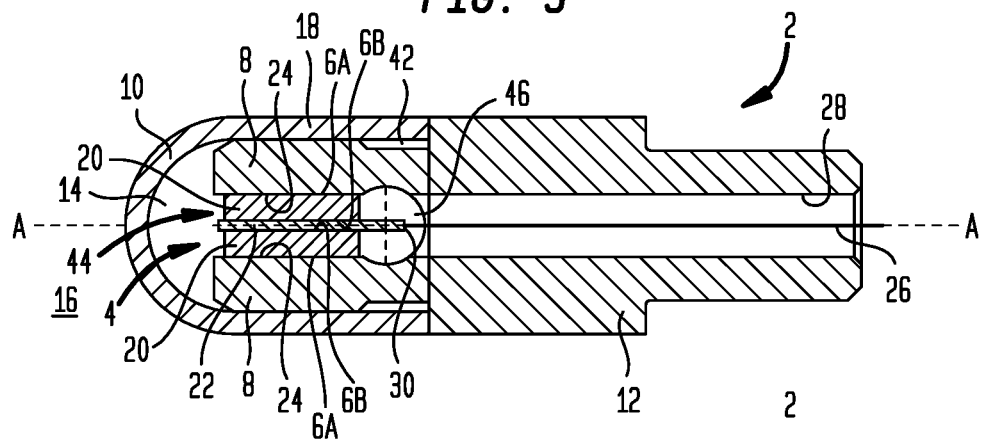
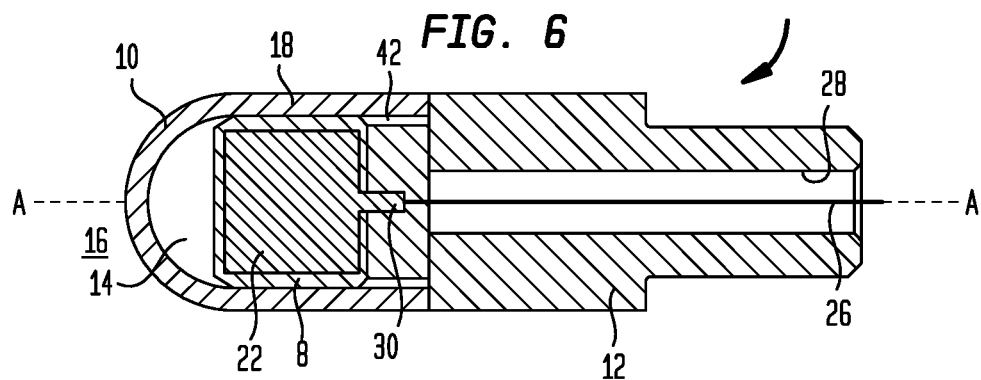

PRESSURE SENSOR

BACKGROUND

1. Field

The present disclosure relates to sensors for measuring pressure. More particularly, the disclosure is directed to pressure sensors that measure dynamic pressure pulsations using a piezoelectric transducer. Still more particularly, the disclosure concerns piezoelectric pressure sensors for measuring cylinder pressures in internal combustion engines.

2. Description of the Prior Art

By way of background, piezoelectric pressure sensors are sometimes used for measuring pressure pulsations inside mechanical apparatus, such as internal combustion engines, and particularly diesel engines. In such environments, the piezoelectric transducer typically needs to be protected against phantom vibration signals and a combination of high temperatures, caustic chemicals (such as fuels and combustion gasses), mechanical stresses, and other hazards. Existing piezoelectric pressure sensors for such applications incorporate the piezoelectric transducer within a rigid protective housing having an opening in which a diaphragm or other force-transmitting member is situated. The piezoelectric transducer is mechanically coupled to the force-transmitting member. Pressure pulsations outside the housing act on the force-transmitting member, causing it to flex or compress the piezoelectric transducer to produce an electrical signal that is proportional to the pressure pulsations.

It is to improvements in such piezoelectric pressure sensors that the present disclosure is directed. In particular, a highly compact piezoelectric pressure sensor is proposed that is well-suited for mounting in an internal combustion engine to measure cylinder pressure, and is substantially insensitive to mechanical vibration.

SUMMARY

In accordance with example embodiments of the present disclosure, an improved piezoelectric pressure sensor is characterized by a piezoelectric transducer having substantially parallel piezoelectric plate faces oriented in planes that are substantially parallel to a principal longitudinal axis of the pressure sensor. The piezoelectric transducer has primary sensitivity to pressure forces directed substantially perpendicular to the principal longitudinal axis, and is comparatively insensitive to forces directed substantially parallel to the principal longitudinal axis. A pair of clamping members engage the piezoelectric plate faces, and a membrane cap covers the clamping members. The membrane cap is mounted on a stem to define an enclosed protective chamber that isolates the piezoelectric transducer and the clamping members from an environment outside the membrane cap.

The membrane cap has a membrane wall engaging outside faces of the clamping members. The membrane wall undergoes inward deflections in response to pressure increases in the environment outside the membrane cap. The clamping members undergo corresponding inward deflections in response to the inward deflections of the membrane wall. The inward deflections of the clamping members act on the piezoelectric plate faces, resulting in deformations of the piezoelectric transducer that produce corresponding electrical signals.

In an embodiment, the piezoelectric transducer includes a pair of piezoelectric elements separated by an electrode plate.

In an embodiment, the piezoelectric elements each have inside and outside piezoelectric plate faces. The inside piezoelectric plate faces engage the electrode plate and provide a first electrical pole of the piezoelectric transducer. The outside piezoelectric plate faces engage inside faces of the clamping members and provide a second electrical pole of the piezoelectric transducer.

In an embodiment, the electrode plate is in electrical communication with an electrical conductor that extends through the stem, and provides a first electrical pathway to the first electrical pole of the piezoelectric transducer.

In an embodiment, the electrode plate covers the entire area of the inside piezoelectric plate faces, and includes a protruding electrode terminal to which the electrical conductor is attached.

In an embodiment, the clamping members include electrically conductive material that is in electrical communication with the outside piezoelectric plate faces via the inside faces of the clamping members, such that the clamping members provide a second electrical pathway to the second electrical pole of the piezoelectric transducer.

In an embodiment, the membrane cap includes a substantially dome-shaped free end and a substantially non-tapered base end that is substantially cylindrical in shape.

In an embodiment, the membrane cap includes a substantially flat-shaped free end and a substantially non-tapered base end that is substantially cylindrical in shape.

In an embodiment, the membrane cap includes a substantially dome-shaped free end and a substantially tapered base end that tapers inwardly toward the free end.

In an embodiment, the membrane cap includes a base end that seats on a shoulder formed on the stem.

In an embodiment, the base end of the membrane cap is bonded to the stem.

In an embodiment, the clamping members are part of a fork on the stem that extends from the stem shoulder.

In an embodiment, the fork includes outside faces that are laterally recessed adjacent to the stem shoulder to provide a pocket that facilitates bonding of the membrane cap base end to the stem.

In an embodiment, the fork includes a slot that defines the inside faces of the clamping members. The slot has a laterally enlarged slot pocket at a base end thereof to facilitate bonding of the piezoelectric transducer to the fork.

In an embodiment, the stem comprises a base end configured for connection to a pressure sensor holder.

In an embodiment, the piezoelectric transducer includes piezoelectric elements having either no shear sensitivity, or having shear sensitivity but which are arranged to compensate for the shear sensitivity.

BRIEF DESCRIPTION OF THE DRAWINGS

The foregoing and other features and advantages will be apparent from the following more particular description of example embodiments, as illustrated in the accompanying Drawings, in which:

FIG. 3 is a side elevation view of the piezoelectric pressure sensor of FIG. 1;

FIG. 4 is a front end view of the piezoelectric pressure sensor of FIG. 1;

FIG. 5 is a cross-sectional side view taken along line 5-5 in FIG. 4;

FIG. 6 is a cross-sectional plan view taken along line 6-6 in FIG. 4;

DETAILED DESCRIPTION OF EXAMPLE EMBODIMENTS

Figure 1:
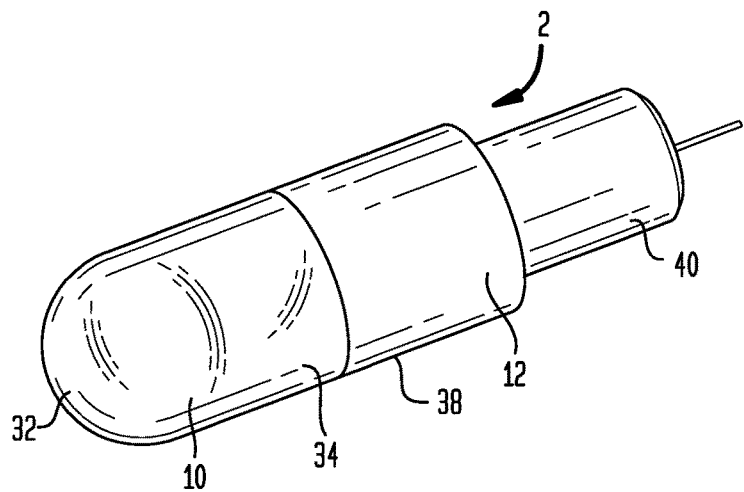
FIG. 1 is a perspective view showing a piezoelectric pressure sensor according to a first example embodiment.

Turning now to the drawing figures, which are not necessarily to scale, like reference numbers will be used to represent like elements in all of the several views. FIGS. 1-6 illustrate a piezoelectric pressure sensor 2 constructed in accordance with one example embodiment. In this illustrated embodiment, the disclosed pressure sensor 2 is characterized by a piezoelectric transducer 4 (see FIG. 2) having substantially parallel, outside piezoelectric plate faces 6A. The outside piezoelectric plate faces 6A are oriented in planes that are substantially parallel to a principal longitudinal axis A-A (see FIGS. 5 and 6) of the pressure sensor 2. The piezoelectric transducer 4 has primary sensitivity to pressure forces directed substantially perpendicular to the principal longitudinal axis A-A, and is comparatively insensitive to forces directed substantially parallel to the principal longitudinal axis.

Figure 2:
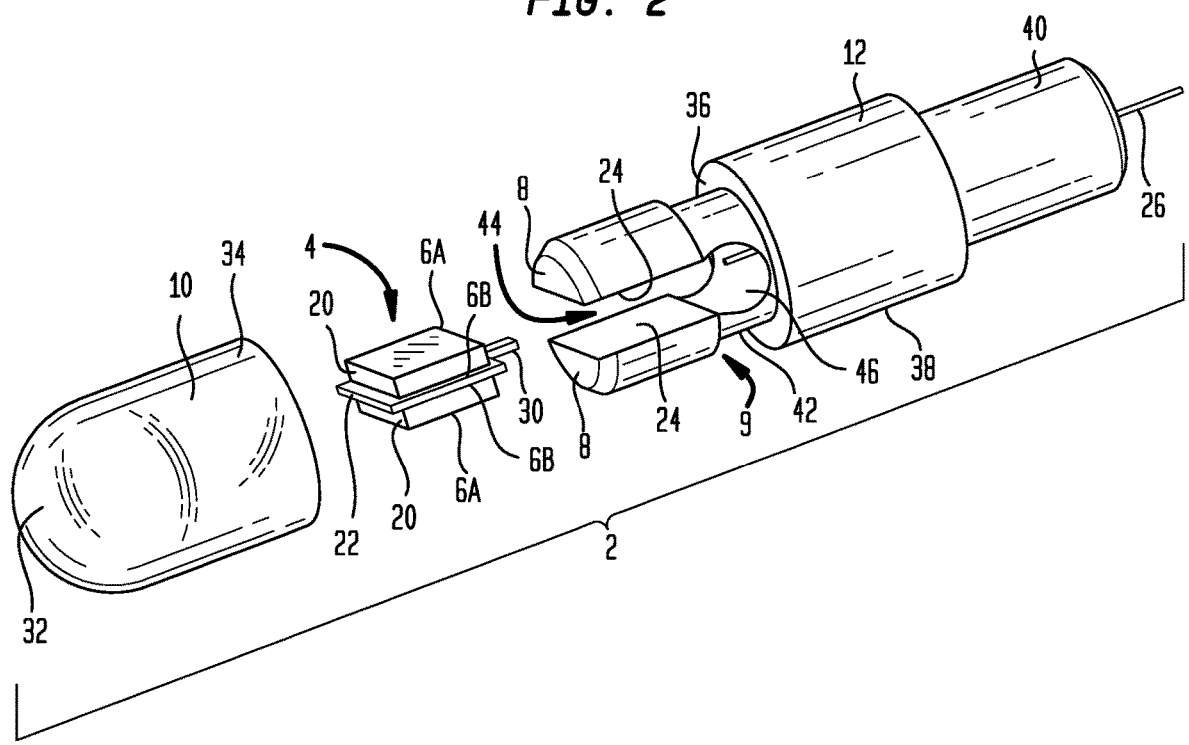
FIG. 2 is an exploded perspective view of the piezoelectric pressure sensor of FIG. 1.

A pair of clamping members 8 engage the piezoelectric plate faces. A membrane cap 10 covers the clamping members and is mounted on a stem 12 of the pressure sensor 2. As shown in FIGS. 5 and 6, the mounted combination of the membrane cap 10 and the stem 12 define an enclosed protective chamber 14 that isolates the piezoelectric transducer 4 and the clamping members 8 from an environment 16 outside the membrane cap. As shown in FIG. 2, the clamping members 8 may be provided as part of a fork 9 of the stem 12. Alternatively, the clamping members 8 could be independent of the stem 12, and provided as individual elements.

As shown in FIGS. 5 and 6, the membrane cap 10 has a membrane wall 18 engaging outside faces 20 of the clamping members 8. The membrane wall 18 undergoes lateral inward deflections in response to dynamic increases in ambient pressure in the environment 16 outside the membrane cap 10. The clamping members 8 undergo corresponding lateral inward deflections in response to the inward deflections of the membrane wall 18. The lateral inward deflections of the clamping members 8 act on the outside piezoelectric plate faces 6A, resulting in compressive deformations of the piezoelectric transducer 4 that produce corresponding electrical signals. Dynamic decreases in ambient pressure in the environment 16 outside the membrane cap produce lateral outward deflections of the membrane wall 18 and the clamping members 8, resulting in uncompressive deformations of the piezoelectric transducer 4 that produce corresponding electrical signals. The electrical signals produced by the piezoelectric transducer 4 may be amplified and otherwise processed in the usual manner using conventional circuitry (not shown).

As best shown in FIGS. 2 and 5, the piezoelectric transducer 4 includes a pair of piezoelectric elements 20 separated by an electrode plate 22. The piezoelectric elements 20 each have inside and outside piezoelectric plate faces, the outside plate faces being the previously discussed plate faces designated by reference number 6A, and the inside plate faces being designated by reference number 6B. The inside piezoelectric plate faces 6B engage the electrode plate 22 and provide a first electrical pole of the piezoelectric transducer 4. The outside piezoelectric plate faces 6A engage inside faces 24 of the clamping members 8, and provide a second electrical pole of the piezoelectric transducer 4 that is distributed between the two outside piezoelectric plate faces.

As previously noted, the piezoelectric transducer 4 has primary sensitivity in a direction that is substantially perpendicular to the principal longitudinal axis A-A. This is the direction normal to the outside and inside plate faces 6A and 6B of the piezoelectric elements 20. In contrast, the piezoelectric transducer 4 is comparatively insensitive to forces directed substantially parallel to the principal longitudinal axis A-A. This is the direction parallel to the outside and inside plate faces 6A and 6B of the piezoelectric elements 20.

As a consequence of the above-described construction, the pressure sensor 2 is substantially immune to vibration in comparison to certain prior art piezoelectric pressure sensors. In such prior art sensors, it is common to arrange a pressure-sensing piezoelectric element with its plate surfaces oriented in planes that are substantially perpendicular to the principal longitudinal axis of the sensor. The piezoelectric element thus has primary sensitivity in a direction that is parallel to the principal axis, which makes it susceptible to the inertial masses of other internal sensor components arranged along the same axis. External vibrations can perturb the inertial masses and thereby excite the piezoelectric element, causing it to produce a corresponding vibration signal at its output. One solution used to compensate for this effect is to add several "damping" piezoelectric elements that are electrically connected with a polarity opposite to that of the main pressure-sensing piezoelectric element. Extra mass may be required to make such compensation more accurate.

In the pressure sensor 2, such compensation measures are not needed because vibration sensitivity is inherently minimized by the sensor design. The pressure sensitivity of the piezoelectric transducer 4 is substantially perpendicular to the principal longitudinal axis A-A. In this direction, there are substantially no inertial forces from other internal pressure sensor components to excite the piezoelectric transducer 4. Inertial forces parallel to the longitudinal axis A-A represent shear forces on the piezoelectric transducer 4. Many piezoelectric materials, such as ceramics, have little or no shear sensitivity. For piezoelectric materials that do have shear sensitivity, vibrations can be minimized by orienting the piezoelectric elements 20 in opposite directions to provide shear compensation. For example, looking normal to the surface of either piezoelectric element 20, that element may be rotated 180 degrees (clockwise or counterclockwise) relative to the other piezoelectric element. Shear forces that induce a positive voltage differential in one piezoelectric element 20 will thus induce a negative voltage differential in the other piezoelectric element, and visa versa. Advantageously, no additional compensation measures, such as the addition of further piezoelectric elements, are required.

As can be seen in FIGS. 2, 5 and 6, the electrode plate 22 is in electrical communication with an electrical conductor 26 that extends through a bore 28 formed in the stem 12. The electrical conductor 26 provides a first electrical pathway to the first electrical pole of the piezoelectric transducer 4. The electrode plate 22 may be sized to cover the entire area of the inside piezoelectric plate faces 6B, and may include a protruding electrode terminal 30 to which the electrical conductor 26 is attached.

The clamping members 8 are formed of an electrically conductive material that is in electrical communication with the outside piezoelectric plate faces 6A via the inside faces 24 of the clamping members. In this way, the clamping members 8 provide a second electrical pathway to the second electrical pole of the piezoelectric transducer 4. In the illustrated embodiment wherein the clamping members 8 are part of the fork 9 on the stem 12, the second electrical pathway will include the entire stem.

As best shown in FIGS. 1-3, the membrane cap 10 includes a substantially dome-shaped free end 32 and a substantially non-tapered base end 34 that is substantially cylindrical in shape. The base end 34 of the membrane cap 10 seats on an annular shoulder 36 formed on a substantially cylindrical medial section 38 of the stem 12 (see FIG. 2). The medial section 38 may have an outer diameter that matches the diameter of the base end 34 of the membrane cap 10. This results in the streamlined bullet-shaped configuration shown in FIGS. 1 and 3. The stem 12 further includes a substantially cylindrical base end 40 that may be of smaller diameter than the medial section 38. The base end 40 may be configured (e.g., with threads) for connection to a pressure sensor holder (not shown). The outside diameter of the pressure sensor holder may be sized to match the outside diameter of the medial section 38 of the stem 12. For pressure sensing in an internal combustion engine, this allows the pressure sensor 2 to be introduced through a small bore in an engine cylinder head or block that accesses one of the engine's combustion chambers.

The base end 34 of the membrane cap 10 may be bonded to the stem 12 in any suitable manner, including by way of adhesive, soldering, welding or other types of bonding. To facilitate such bonding, the outside faces of the fork 9 may be laterally recessed adjacent to the shoulder 36 to provide a pocket 42 (see FIGS. 2, 5 and 6) that can accommodate the flow of bonding material.

As shown in FIGS. 2 and 5, the fork 9 includes a slot 44 that defines the inside faces 24 of the clamping members 8. The slot 44 extends longitudinally rearwardly to a base end thereof situated proximate to the medial section 38 of the stem 12. At this base end, the slot 44 may be formed with a laterally enlarged slot pocket 46. The enlarged slot pocket 46 facilitates bonding of the piezoelectric transducer 4 to the fork 9. In particular, the protruding terminal 30 of the electrode 22 extends into the slot pocket 46, and the pocket may be filled with a suitable adhesive that bonds to the electrode and anchors the transducer 4. Insofar as the electrode 22 provides one of the piezoelectric transducer's electrical pathways, whereas the other electrical pathway includes the clamping members 4, and by extension, the entire stem 12 itself, the adhesive should be electrically insulative in nature. The electrical conductor 26 should likewise be covered with an insulator, or alternatively, the bore 28 through which the electrical conductor 26 passes may be potted with an electrically insulative material.

The various components of the pressure sensor 2 may be constructed of any suitable materials that are consistent with the intended use of the sensor. For most applications, the piezoelectric transducer elements 20 can be formed from quartz, langatate (LGT) crystals, ceramics, or other materials that exhibit the piezoelectric effect. For the remaining components, suitable materials may include metals and metal alloys such as steel, brass, titanium, aluminum, etc. For pressure sensing applications involving diesel engines, stainless steel has been found to be a satisfactory material for the membrane cap 10, the stem 12 and the electrode 22. If desired, two different stainless steel grades for the membrane cap 10 and stem 12 may be used, with the grades being selected so that the coefficient of thermal expansion of the membrane cap is less than that of the stem. This ensures that the membrane cap 10 will affirmatively engage the clamping members 8, with no wall separation occurring at higher temperatures. By way of example only, the membrane cap 10 may be formed from 416 stainless steel and the stem 12 may be formed from 316 or 305 stainless steel.

To ensure suitable pressure sensor sensitivity, the membrane cap 10 and the fork portion 9 of the stem 12 need to be sufficiently flexible to respond to dynamic pressure pulsations in the ambient environment 16 outside the pressure sensor 2 within the sensor's design pressure range. Apart from material choices, as discussed above, providing the desired flexibility of the membrane cap 10 will entail the selection of a suitable thickness for the membrane wall 18. For an embodiment of the pressure sensor 2 designed for diesel engine pressure sensing applications, the membrane wall thickness may be approximately 0.3-0.5 mm when 416 stainless steel is used as the membrane cap material. In such an embodiment, the membrane cap 10 may have an outside diameter of approximately 4.5-5.0 mm and an overall length of approximately 7.0 mm. In the same embodiment, the rounded end 32 of the membrane cap may have a radiused configuration with a radius of curvature (at its outside surface) of approximately 2.5 mm. It will be appreciated that the foregoing materials and dimensions are set forth by way of example only. In other embodiments of the pressure sensor 2, the membrane cap 10 may have different dimensions and/or be formed from different materials.

For the stem 12, the flexibility of each fork element of the fork 9 is increased by virtue of the pockets 42 and 46 formed at the fork's base end. The pockets 42 and 46 decrease the wall thickness at the base end of the fork in the lateral flex direction, so that the clamping members 8 will deflect more readily. For an embodiment of the pressure sensor 2 designed for diesel engine pressure sensing applications, the base-end thickness of each fork element (at the lateral midpoint) may be approximately 0.75 mm when 316 stainless steel is used as the fork material. In such an embodiment, each fork element may have a base-end lateral width of approximately 3.5 mm and a base-end length (representing the longitudinal extent of the pockets 42 and 46) of approximately 1.5 mm. In the same embodiment, the gap width of the slot 44, which corresponds to the thickness of the piezoelectric transducer 4, may be approximately 1.5 mm. At the lateral midpoint of each clamping member 8, the thickness in the deflection direction may be approximately 1.2 mm for this embodiment. The clamping members 8 of this embodiment may have a width of approximately 4.0 mm, and an overall length of approximately 3.5 mm. It will be appreciated that the foregoing materials and dimensions are set forth by way of example only. In other embodiments of the pressure sensor 2, the fork 9 of the stem 12 may have different dimensions and/or be formed from different materials.

Figure 7:
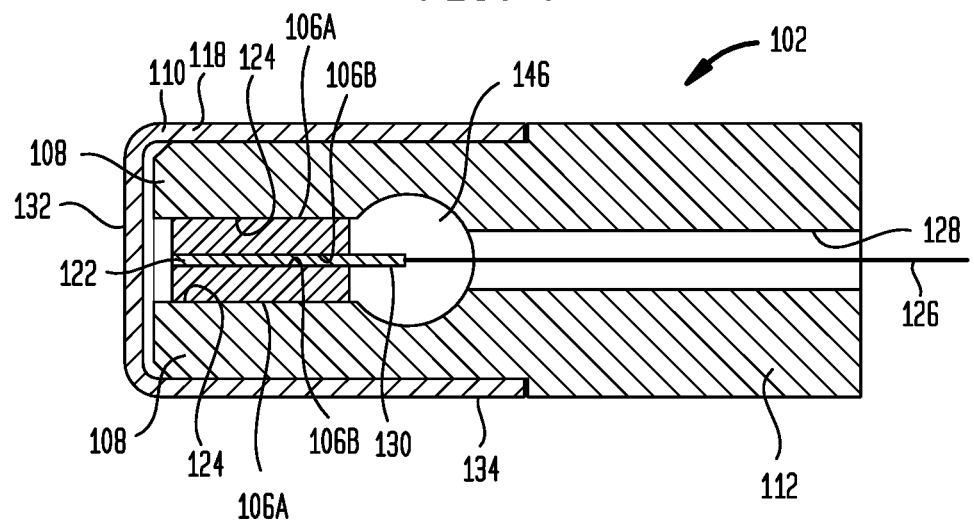
FIG. 7 is a cross-sectional side view showing a piezoelectric pressure sensor according to a second example embodiment.

Turning now to FIG. 7, an alternative pressure sensor 102 is constructed in accordance with another example embodiment. This embodiment is similar in many respects to the pressure sensor 2 of FIGS. 1-6, and corresponding structure is illustrated by corresponding reference numbers incremented by 100. The pressure sensor 102 differs from the pressure sensor 2 by virtue of the membrane cap 110 having a substantially flat-shaped (planar) free end 132 in combination with a substantially non-tapered base end 134 that is substantially cylindrical in shape.

Figure 8:
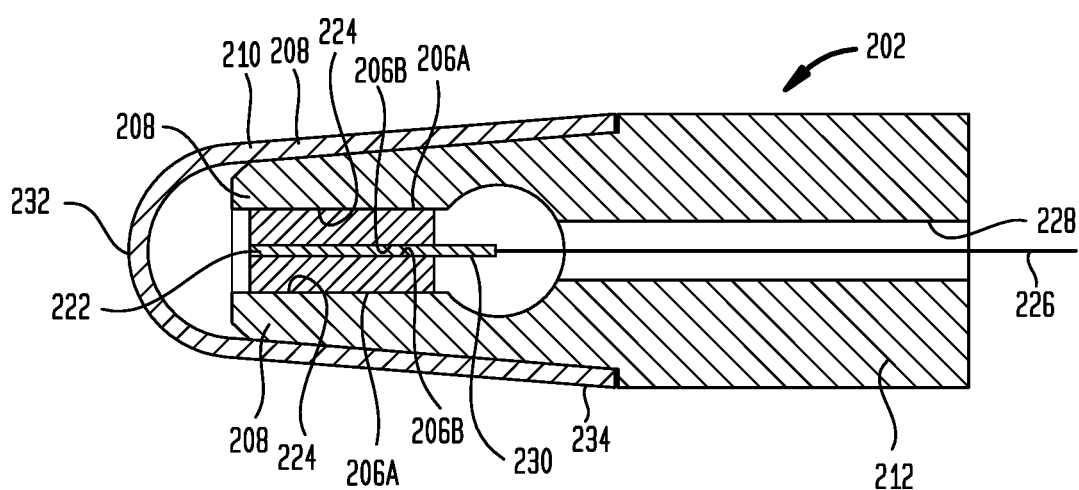
FIG. 8 is a cross-sectional side view showing a piezoelectric pressure sensor according to a third example embodiment.

Turning now to FIG. 8, an alternative pressure sensor 202 is constructed in accordance with another example embodiment. This embodiment is also similar in many respects to the pressure sensor 2 of FIGS. 1-6, and corresponding structure is illustrated by corresponding reference numbers incremented by 200. The pressure sensor 202 differs from the pressure sensor 2 by virtue of the membrane cap 210 having a substantially dome-shaped free end 232 in combination with a substantially tapered base end 234 that tapers radially inwardly toward the free end. The clamping members 208 are correspondingly tapered on their outside surfaces.

Accordingly, several embodiments of a piezoelectric pressure sensor have been disclosed. Advantageously, the pressure sensor may be constructed in a very compact manner and is inherently designed to minimize sensitivity to vibration. The pressure sensor is ideal for measuring cylinder pressure in an internal combustion engine, and for other pressure-sensing applications. Although various example embodiments have been shown and described, it should be apparent that many variations and alternative embodiments could be implemented in accordance with the disclosure. For example, membrane caps with other configurations could be used. Moreover, although the disclosed piezoelectric transducers have two piezoelectric elements, other piezoelectric transducers having one or more piezoelectric elements that can be situated between a pair of clamping members may be used. It is understood, therefore, that the invention is not to be in any way limited except in accordance with the spirit of the appended claims and their equivalents.

What is claimed is:

1. A piezoelectric pressure sensor, comprising:
   a piezoelectric transducer having substantially parallel piezoelectric plate faces oriented in planes that are substantially parallel to a principal longitudinal axis of said pressure sensor, said piezoelectric transducer having primary sensitivity to pressure forces directed substantially perpendicular to said principal longitudinal axis, and being comparatively insensitive to forces directed substantially parallel to said principal longitudinal axis;
   a pair of clamping members engaging said piezoelectric plate faces;
   a membrane cap covering said clamping members;
   said membrane cap being mounted on a stem to define an enclosed protective chamber that isolates said piezoelectric transducer and said clamping members from an environment outside of said membrane cap;
   said membrane cap having a membrane wall engaging outside faces of said clamping members;
   said membrane wall undergoing inward deflections in response to pressure increases in said environment outside said membrane cap;
   said clamping members undergoing corresponding inward deflections in response to said inward deflections of said membrane wall;
   said inward deflections of said clamping members acting on said piezoelectric plate faces, resulting in deformations of said piezoelectric transducer that produce corresponding electrical signals;
   said membrane cap comprising a base end that seats on a shoulder formed on said stem;
   said base end of said membrane cap being bonded to said stem; and
   said clamping members being part of a fork on said stem that extends from said shoulder of said stem.

2. The sensor of claim 1 wherein said piezoelectric transducer comprises a pair of piezoelectric elements separated by an electrode plate.

3. The sensor of claim 2, wherein said piezoelectric elements each have inside and outside piezoelectric plate faces, said inside piezoelectric plate faces engaging said electrode plate and providing a first electrical pole of said piezoelectric transducer, and said outside piezoelectric plate faces engaging inside faces of said clamping members and providing a second electrical pole of said piezoelectric transducer.

4. The sensor of claim 3, wherein said electrode plate is in electrical communication with an electrical conductor that extends through said stem and provides a first electrical pathway to said first electrical pole of said piezoelectric transducer.

5. The sensor of claim 4, wherein said electrode plate covers the entire area of said inside piezoelectric plate faces, and includes a protruding electrode terminal to which said electrical conductor is attached.

6. The sensor of claim 4, wherein said clamping members comprise an electrically conductive material that is in electrical communication with said outside piezoelectric plate faces via said inside faces of said clamping members, such that said clamping members provide a second electrical pathway to said second electrical pole of said piezoelectric transducer.

7. The sensor of claim 1, wherein said membrane cap comprises a substantially dome-shaped free end and a substantially non-tapered base end.

8. The sensor of claim 7, wherein said base end of said membrane cap is substantially cylindrical in shape.

9. The sensor of claim 1, wherein said membrane cap comprises a substantially flat-shaped free end and a substantially non-tapered base end.

10. The sensor of claim 9, wherein said base end of said membrane cap is substantially cylindrical in shape.

11. The sensor of claim 1, wherein said membrane cap comprises a substantially dome-shaped free end and a substantially tapered base end that tapers inwardly toward said free end.

12. The sensor of claim 1, wherein said fork comprises outside faces that are laterally recessed adjacent to said shoulder of said stem to provide a pocket that facilitates bonding of said base end of said membrane cap to said stem.

13. The sensor of claim 12, wherein said fork comprises a slot that defines inside faces of said clamping members, said slot having a laterally enlarged slot pocket at a base end thereof to facilitate bonding of said piezoelectric transducer to said fork.

14. The sensor of claim 1, wherein said stem comprises a base end configured for connection to a pressure sensor holder.

15. The sensor of claim 1, wherein said piezoelectric transducer comprises piezoelectric elements having either no shear sensitivity, or having shear sensitivity but which are arranged to compensate for said shear sensitivity.

16. A piezoelectric pressure sensor, comprising:
    a stem;
    a fork on said stem having a pair of fork members that define a slot;
    a piezoelectric transducer disposed in said slot of said fork, said piezoelectric transducer having piezoelectric plate faces engaging inside faces of said fork members, said piezoelectric plate faces being oriented in planes that are substantially parallel to a principal longitudinal axis of said pressure sensor, said piezoelectric transducer having primary sensitivity to pressure forces directed substantially perpendicular to said principal longitudinal axis, and being comparatively insensitive to forces directed substantially parallel to said principal longitudinal axis;

a membrane cap mounted on said stem, said membrane cap covering said fork and enclosing said piezoelectric transducer in a protective chamber that is isolated from an environment outside of said membrane cap;

said membrane cap having a membrane wall engaging outside faces of said fork members;

said membrane wall undergoing inward deflections in response to pressure increases in said environment outside said membrane cap;

said fork members undergoing corresponding inward deflections in response to said inward deflections of said membrane wall; and said inward deflections of said fork members acting on said piezoelectric plate faces, resulting in deformations of said piezoelectric transducer that produce corresponding electrical signals.

17. A piezoelectric pressure sensor, comprising:

a stem having a fork section, a medial section and a base section arranged along a principal longitudinal axis of said pressure sensor;

said fork section comprising a pair of fork members that define a slot centered on said principal longitudinal axis;

a piezoelectric transducer disposed in said slot of said fork section, said transducer having piezoelectric plate faces engaging inside faces of said fork members, said piezoelectric plate faces being oriented in planes that extend substantially parallel to said principal longitudinal axis, said piezoelectric transducer having primary sensitivity to pressure forces directed substantially perpendicular to said principal longitudinal axis, and being comparatively insensitive to forces directed substantially parallel to said principal longitudinal axis;

a membrane cap mounted on said medial section, said membrane cap covering said fork section and enclosing said piezoelectric transducer in a protective chamber that is isolated from an environment outside of said membrane cap;

said membrane cap comprising a metallic material having a lower coefficient of thermal expansion than a metallic material that comprises said stem;

said membrane cap having a membrane wall engaging outside faces of said fork members;

said membrane wall undergoing inward deflections in response to pressure increases in said environment outside said membrane cap;

said fork members undergoing corresponding inward deflections in response to said inward deflections of said membrane wall;

said inward deflections of said fork members acting on said piezoelectric plate faces, resulting in deformations of said transducer that produce corresponding electrical signals;

said piezoelectric transducer comprising a pair of piezoelectric elements separated by an electrode plate;

said piezoelectric elements each having inside and outside piezoelectric plate faces, said inside piezoelectric plate faces engaging said electrode plate and providing a first electrical pole of said piezoelectric transducer, and said outside piezoelectric plate faces engaging inside faces of said fork members and providing a second electrical pole of said piezoelectric transducer;

said electrode plate being in electrical communication with an electrical conductor that extends through a bore in said base section of said stem and provides a first electrical pathway to said first electrical pole of said piezoelectric transducer;

said electrode plate covering the entire area of said inside piezoelectric plate faces, and including a protruding electrode terminal to which said electrical conductor is attached;

said stem comprising electrically conductive material that is in electrical communication with said outside piezoelectric plate faces via said inside faces of said fork members, such that said stem provides a second electrical pathway to said second electrical pole of said piezoelectric transducer;

said membrane cap comprising a substantially dome-shaped free end and a substantially non-tapered base end;

said base end of said membrane cap being seated on and bonded to said stem;

said fork section comprising outside faces that are laterally recessed adjacent to a shoulder of said stem to provide a pocket that facilitates bonding of said base end of said membrane cap to said stem;

said slot of said fork section being defined by inside faces of said clamping members and having a laterally enlarged slot pocket at a base end thereof to facilitate bonding of said piezoelectric transducer to said fork section;

said stem comprising a base end configured for connection to a pressure sensor holder; and said piezoelectric elements having either no shear sensitivity, or having shear sensitivity but which are arranged to compensate for said shear sensitivity.

* * * * *